United States Patent [19]

Wiedemann

[11] Patent Number: 5,345,604
[45] Date of Patent: Sep. 6, 1994

[54] FM VEHICLE RADIO WITH MODULAR PHASE SHIFTERS

[75] Inventor: Kurt Wiedemann, Hildesheim, Fed. Rep. of Germany

[73] Assignee: Blaupunkt-Werke GmbH, Hildesheim, Fed. Rep. of Germany

[21] Appl. No.: 842,889

[22] Filed: Feb. 26, 1992

[30] Foreign Application Priority Data

Mar. 19, 1991 [DE] Fed. Rep. of Germany ....... 4108933

[51] Int. Cl.⁵ ............................................ H04B 17/02
[52] U.S. Cl. ..................................... 455/139; 455/205; 455/273; 455/276.1; 333/119; 333/131
[58] Field of Search ........................... 455/137–139, 455/205, 276.1, 273, 274; 333/119, 131, 156, 164

[56] References Cited

U.S. PATENT DOCUMENTS

| | | | |
|---|---|---|---|
| 2,420,868 | 5/1947 | Crosby | 455/138 |
| 2,975,275 | 3/1961 | Adams | 455/138 |
| 3,273,079 | 9/1966 | Curtis | 333/119 |
| 3,296,557 | 1/1967 | Petts, 3rd et al. | 333/119 |
| 3,528,012 | 9/1970 | Kahn | 455/137 |
| 3,609,663 | 9/1971 | Bickford et al. | 455/138 |
| 4,355,419 | 10/1982 | Hiyama | 455/137 |
| 4,939,791 | 7/1990 | Bochmann et al. | 455/276.1 |

Primary Examiner—Reinhard J. Eisenzopf
Assistant Examiner—Andrew Faile
Attorney, Agent, or Firm—Frishauf, Holtz, Goodman & Woodward

[57] ABSTRACT

A modularly-designed FM vehicle radio for operation in connection with a plurality of antennas is disclosed, where the summing circuit consists of a series connection of the secondary coils of the output transformers of the input stages.

5 Claims, 1 Drawing Sheet

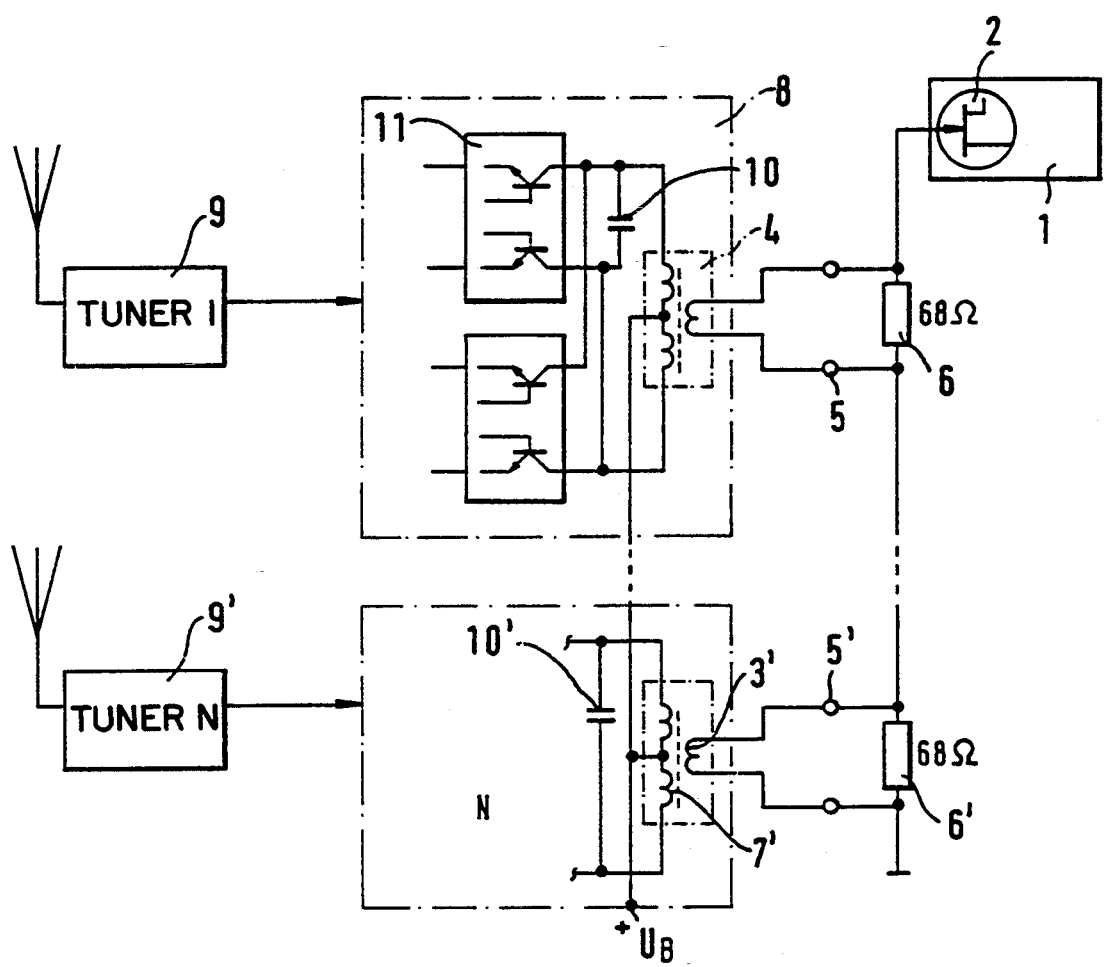

FM VEHICLE RADIO WITH MODULAR PHASE SHIFTERS

CROSS-REFERENCE TO RELATED PATENT, THE DISCLOSURE OF WHICH IS HEREBY INCORPORATED BY REFERENCE

U.S. Pat. No. 4,949,791, BOCHMANN & WIEDEMANN, issued Jul. 3, 1990, entitled DIVERSITY RADIO RECEIVER FOR USE WITH MULTIPLE ANTENNA, PARTICULARLY CAR RADIO.

FIELD OF THE INVENTION

The invention relates to a novel FM car radio for operation in connection with a plurality of reception antennas.

BACKGROUND

A receiver for radio waves in the VHF and UHF range, which is to be operated with a plurality of antennas disposed at different points on the same vehicle is described in my German Published Patent Application DE-OS 37 41 698 and corresponding U.S. Pat. No. 4,939,791. In this receiver, the output signals of the individual antennas are supplied via downstream input phases to a summing circuit after suitable shifting of the phase position.

THE INVENTION

Accordingly, it is an object of the invention to develop an advantageous design of such a summing circuit in the form of a modular construction of the device, where the components of the input stages, which are placed upstream of the summing circuit and downstream of each antenna, are combined on an exchangeable circuit board.

DRAWING

The single drawing FIGURE is a circuit diagram of the summing circuit of the invention.

DETAILED DESCRIPTION

The output of the summing circuit acts on an amplifier 1, in the input of which a field effect transistor 2 has been placed, which amplifies the summing signal. The input path of a field effect transistor is known to have high resistance. Four secondary coils 3 of several transformers 4 are connected in series in the input circuit of the field effect transistor. At 5, the transformers are pluggably connected with the remaining circuits of the field effect transistor.

A resistor 6 is located parallel to the secondary coil 3, but is a part of the circuit of the field effect transistor.

The primary coil 7 of the transformer 4 constitutes the output of a phase shifter 8 which here is placed downstream of the input stage 9. Details of these phase shifters, their control and their function can be found in my earlier U.S. Pat. No. 4,939,791, mentioned above.

Together with the capacitor 10, the primary coil 7 forms a bandpass filter. The bandpass filters are tuned to the intermediate frequency of the car radio.

Current sources 11, the currents of which overlap each other in the primary coil 7 of the transformer in the manner indicated, are located ahead of the primary coil 7 of the transformer 4 and are controlled as outputs of the circuit mentioned in German DE-OS 37 41 698 and U.S. Pat. No. 4,939,791.

Each of the transformer primary coils (7) has a tap connected to the tap of each other module and to a voltage supply terminal $(U_B)$.

Because of the subsequent evaluation of the passed signals, the passband curve of the band pass filters must be selected to be broad banded. For this reason it is quite safe if every band pass filter is damped by the resistor 6. The course of the passband curve can be affected by the choice of the size of the resistance and by the transforming conditions of the transformer 4.

In any case, the magnitude of the resistance—68 Ohm in the exemplary embodiment—is small compared with the high-resistance input of the field effect transistor 2. For this reason, signal processing ahead of and behind the field effect transistor remains unaffected, if one or two transformers are pulled out of their plug connectors.

Thus the design of the summing circuit in accordance with the invention is particularly well suited for summing a variable number of antenna signals.

Various changes and modifications may be made within the scope of the inventive concept.

I claim:

1. An FM vehicle radio for operation in connection with a plurality of antennas disposed in different locations of the vehicle, reception signals of which, converted to an intermediate frequency range, are summed in a summing circuit after control phase shifting and are subsequently demodulated,
    wherein
    a plurality of signal input modules (8) are provided, each including a transformer (4) having a primary coil (7) and a secondary coil (3);
    the secondary coils (3) of said transformers (4) form respective outputs of the plurality of modules (8) and said outputs are connected in series in the summing circuit,
    the terminals of each secondary coil (3, 3') are connected via a plug connection (5, 5') to an input signal path of an amplifier (1, 2), and
    a respective resistor (6) is connected in said input signal path between terminals of each of said plug connections (5, 5').
2. An FM vehicle radio in accordance with claim 1, each resistor (6) has a resistance value selected such that a bandpass filter, formed by the primary coil (7) of the transformer (4) and a capacitor (10) connected in parallel with said primary coil (7), and tuned to the intermediate frequency of the vehicle radio, has a passband which is broad.
3. The FM vehicle radio of claim 2,
    wherein said resistance value is approximately 68 ohms.
4. A mobile diversity radio receiver, comprising:
    an amplifier (1) having a signal input path;
    a field effect transistor (2) connected in said signal input path of said amplifier;
    a plurality of resistors (6, 6') connected in series between ground and a base terminal of said field effect transistor (2);
    a respective two-wire plug connection terminal (5, 5') bridging each of said plurality of resistors (6, 6'); and
    a respective phase-matching signal input module (8) engageable with each of said plug connection terminals (5, 5'),
    each module (8) having an input stage (9, 9') adapted for connection to an antenna;

at least one current source (11) having an input connected to an output of said input stage (9, 9'); and a bandpass filter (7, 10) having input lines connected to said at least one current source (11) and output lines furnishing output signals of said module at said plug connection terminals, whereby at least one module (8) can be disengaged from said receiver while said receiver continues to operate.

5. A radio receiver according to claim 4, wherein:

said bandpass filter is tuned to a predetermined intermediate frequency of said receiver, and comprises a capacitor (10, 10') connected in parallel with a primary coil (7) of a transformer (4), a secondary coil (3, 3') of which furnishes said output signals of said module (8); and wherein each of said transformer primary coils (7) has a tap connected to the tap of each other module and to a voltage supply terminal ($U_B$).

* * * * *